3,345,332
DIPOLAR APROTIC SOLVENT SYSTEM FOR POLYMERIZATION OF BIS-(α-HALOALKYL) AROMATIC COMPOUNDS IN THE PRESENCE OF A COUPLING AGENT
John M. Hoyt and Charles E. Frank, Cincinnati, and Karl Koch, Norwood, Ohio, assignors to National Distillers and Chemical Corporation, New York, N.Y., a corporation of Virginia
No Drawing. Filed Apr. 2, 1964, Ser. No. 356,928
28 Claims. (Cl. 260—47)

This invention relates to a new and improved polymerization process for the preparation of mixed aliphatic-aromatic polymers and copolymers. More specifically, the invention pertains to the coupling of aromatic compounds having at least two substituents, in each of which there are one to three halogen atoms bonded to that substituent carbon atom attached to the aromatic ring, in the presence of dipolar aprotic solvent systems which dissolve the reactants. A further aspect of this invention resides in the preparation of certain novel polymeric products.

It has recently been found that bis-(α-haloalkyl)aromatic compounds can be polymerized, in solution, to the corresponding poly(arylenedialkylene) polymers at temperatures less than about 300° C. in the presence of a lower valent transition metal salt, e.g. chromous sulfate. U.S. patent application Ser. No. 357,279, entitled, "Polymerization Process." It has also recently been found that copolymeric products can be produced by reacting mixtures of one or more bis-(α-haloalkyl)aromatic compounds with certain olefinic compounds at these low temperatures with the same lower valent transition metal salts. U.S. patent application Ser. No. 357,303, entitled "Copolymerization Process." Both of these processes are preferably carried out in the presence of an inert atmosphere, e.g. nitrogen, to avoid oxidation of the lower valent transition metal salt. The processes also call for dissolving the lower valent transition metal salt in a hydroxylic solvent such as water, methanol, ethylene glycol and the like. It has been found important to employ a solvent for the bis-(α-haloalkyl)aromatic compounds and for the olefinic compounds. When the latter solvents are employed, they were required to be miscible with the hydroxylic solvent used in conjunction with the lower valent transition metal salt. Typical examples of such miscible solvents are acetone, p-dioxane and the like. In another recent development it was found that increased yields and higher molecular weight polymer and copolymer products could be achieved by employing in conjunction with the hydroxylic solvent for the lower valent transition metal salt or coupling agent an organic solvent for the bis-(α-haloalkyl)aromatic compounds and the olefinic compounds, if utilized. One essential characteristic of the organic solvent is that it be substantially immiscible with the hydroxylic solvent. Although the preferred organic solvent was found to be decalin, other possible organic solvents included cyclohexane, benzene, toluene, xylene, o-dichlorobenzene, lower molecular weight alkanes as well as aromatic and aliphatic ketones, esters and ethers. U.S. patent application Ser. No. 356,943, entitled "Improved Polymerization Process for Aromatic Compounds."

The presence of hydroxylic solvents in the above-described polymerization and copolymerization processes has been found to result in some undesirable limitations. For one thing, the use of a proton-releasing solvent, i.e. a hydroxylic solvent, has in some cases resulted in the occurrence of hydrogen transfer reactions which prevent high molecular weight polymer formation as well as the production of undesirable by-products. In addition, it has been generally found that only ortho- and para-(phenylenedialkylene) polymers have been obtained when hydroxylic solvents are present in the reaction mixtures. It has also been found difficult to prepare polymers and copolymers wherein α-haloalkyl groups exist on isolated, non-conjugated rings in the bis-(α-haloalkyl)aromatic compounds. It has likewise been difficult to prepare useful polymers and copolymers wherein the coupling occurs through α,α-dihaloalkyl,α,α,α-trihalomethyl or acyl halide groups bonded to aromatic nuclei because of the hydrolytic instability of certain of these groups and because of the difficulty in fabricating the polymer formed.

One object of the present invention is to provide new and improved polymerization and copolymerization processes which avoid the limitations of the previously proposed processes.

Another object of the present invention is to provide new and improved polymerization and copolymerization processes which result in the formation of meta- as well as ortho- and para(diphenylenedialkylene) polymers and copolymers.

A further object of the present invention is to provide new and improved polymerization and copolymerization processes which can utilize bis-(α-haloalkyl)aromatic compounds containing α-haloalkyl groups on isolated, non-conjugated rings.

A still further object of the present invention is to provide new and improved polymerization processes which can utilize related aromatic compounds containing at least two substituents, selected from the group consisting of α-haloalkyl, α,α-dihaloalkyl, α,α,α-trihalomethyl radicals and acyl halide radicals.

An additional object of the present invention is to provide certain novel polymeric products.

These and other objects of the present invention will become readily apparent from the ensuing description and illustrative embodiments.

In accordance with the present invention it has now been found that one or more aromatic compounds having at least two substituents, in each of which there are one to three halogen atoms bonded to that substituent carbon atom attached to the aromatic ring, or a mixture of one or more such aromatic compounds with certain olefinic compounds, dissolved in a dipolar aprotic solvent, can be reacted in the presence of an anhydrous lower valent transition metal salt, which is also dissolved in a dipolar aprotic solvent, to prepare highly desirable polymers and copolymers. By utilizing the dipolar aprotic solvent system it is possible not only to prepare ortho- and para-(phenylenedialkylene) polymers but also meta-(phenylenedialkylene) polymers as well as polymers and copolymers from bis-(α-haloalkyl)aromatic monomers in which the α-haloalkyl groups are in different, non-conjugated aromatic rings, as well as polymers and copolymers derived by coupling aromatic compounds containing α,α-dihaloalkyl, and α,α,α-trihalomethyl, and acyl halide groups bonded to aromatic nuclei.

Dipolar aprotic solvents have been defined as solvents with dielectric constants greater than 15 which, although they may contain hydrogen atoms, cannot donate suitably labile hydrogen atoms to form strong hydrogen bonds with an appropriate solute. See A. J. Parker, Quart. Rev., 16, No. 2,163 (1962). Common dipolar aprotic solvents are, for example, dimethylformamide, dimethylacetamide, dimethyl sulfoxide, tetrahydrothiophene dioxide, acetone, acetonitrile, nitrobenzene, and propylene carbonate. The preferred dipolar solvents for the present invention are dimethylacetamide and dimethylformamide. Although the amount of dipolar aprotic solvent employed in the process of this invention may vary over a wide range, it will be understood that only sufficient aprotic solvent need be employed which will dissolve the halogen-containing aromatic compound being polymerized, the olefinic compound or vinyl monomer when employed, and the lower valent transition metal salt or coupling agent.

The preferred lower valent transition metals are divalent chromium, divalent vanadium and trivalent titanium; the use of divalent chromium salts is especially preferred. It was also found preferable to employ a transition metal salt with an anion of a strong acid, i.e., an acid which in $\frac{1}{10}$ N aqueous solution has a pH of less than about 2. Such anions include the sulfate, chloride, the phosphate and the like. The use of the chloride anion was found to be preferred for the purposes of this invention, and for purposes of illustration the invention will be described more particularly hereinafter in connection with the use of chromous chloride as the lower valent transition metal salt. Although the foregoing transition metals have been found to be especially useful in carrying out the polymerization process of this invention, other possible lower valent transition metals may be selected from the group consisting of hafnium, zirconium, columbium, tantalum, molybdenum, tungsten, manganese, iron, ruthenium, osmium, cobalt, rhodium, iridium, nickel, palladium, platinum and copper.

In general, the concentration of the lower valent transition metal salt in the reaction mixture will be within the range of about 0.05 to 4 moles, and preferably about 0.1 to 1 mole per liter of reaction mixture.

One of the starting materials for the polymerization process of this invention is an aromatic compound having at least two substituents, in each of which there are one to three halogen atoms bonded to that substituent carbon atom attached to the aromatic ring It has been found useful to employ such aromatic compounds wherein the aromatic constituent is derived from an arene such as benzene, xylene, durene, mesitylene, etc.; a heterocyclic such as thiophene, furan, etc., a fused ring aromatic such as naphthalene, anthracene, tetralin, indane, quinoline, isoquinoline, etc.; or from an aromatic compound having isolated non-conjugated nuclei such as diphenyl ether, diphenyl sulfide, etc. The polymerization of bis-($\alpha$-haloalkyl)arenes by the process of this invention is especially preferred. Although the substituents in each of which there are from one to three halogen atoms bonded to that substituent carbon atom which is attached to the aromatic ring, may be at any position relative to each other in the same ring or in different aromatic rings, it is preferred that they be in positions ortho or para to each other in the same aromatic ring. The halogen atoms contained in the said substituents are selected from the group comprising fluorine, chlorine, bromine and iodine, as well as mixtures thereof. The substituents themselves, in addition to the halogen atoms, may contain about one to twenty carbon atoms and may be either straight or branched chain. However, for most purposes the substituents will contain about one to eight carbon atoms.

In general, the structural formula for the starting material will be:

$$(XCR_1R_2)_n\text{---}Ar\text{---}(CR_3R_4X')_m$$

wherein X and X' are fluorine, chlorine, bromine or iodine, and the X and X' may be the same or different, $R_1$, $R_2$, $R_3$ and $R_4$ are univalent radicals such as bromine, iodine, hydrogen, trifluoromethyl, a lower alkyl group having from 1 to 6 carbon atoms either straight or branched chain, aryl group having 6 to 10 carbon atoms, substituted aryl, or may be replaced in pairs by a divalent radical, e.g., $R_1$ and $R_2$ and $R_3$ and $R_4$ may represent two carbonyl oxygen radicals.

The R substituents may be the same or different.

The subscripts $n$ and $m$ are small positive integers and it is preferred that $n$ and $m$ both be equal to one because it is generally found that crosslinked insoluble polymers are produced when $(n+m)$ is greater than 2. Such materials are virtually impossible to fabricate by known methods. However, in one embodiment of the process of this invention, the polymer may be formed in situ in and on a suitable substrate. In such cases even essentially crosslinked polymeric materials, when produced in situ often exhibit sufficient flow at elevated temperatures and under sufficient pressure to be capable of combining with the substrate to form a composite article relatively continuous in nature and impervious to gas and liquids. In such cases $(n+m)$ may be greater than two and is limited ultimately only by the number of $XCR_1R_2$— and —$CR_3R_4X'$ substituents for which there are positions available in the aromatic constituent Ar.

Ar is the aromatic substituent which is defined above, and the Ar substituent may be further substituted on the ring, and in various positions, with chlorine, bromine, iodine, cyano, nitro, carboxy or carboalkoxy groups, alkyl groups having from 1 to 20 carbon atoms, or alkoxy groups having from 1 to 20 carbon atoms. It will be understood that these alkyl and alkoxy groups may also be either straight or branched chain.

By utilizing such starting materials the mixed aliphatic-aromatic polymers prepared in accordance with the process of this invention will contain the following recurring units $$\text{---}(CR_1R_2)_n\text{---}Ar\text{---}(CR_3R_4)_m\text{---}$$

with the various substituents as defined above. However, it is understood that when $R_1$, $R_2$, $R_3$, and $R_4$ are fluorine, chlorine, bromine or iodine, and are removed in the coupling—polymerization process of this invention, they will then represent carbon-carbon single bonds in the above formula for the recurring units in the polymers of the process of this invention.

For the purposes of a more complete description, the following is a list of bis-(haloalkyl)aromatic compounds which can be effectively employed in the process of this invention:

$\alpha,\alpha'$-dichloro-p-xylene
$\alpha,\alpha'$-dibromo-m-xylene
$\alpha,\alpha'$-difluoro-p-xylene
$\alpha,\alpha'$-dibromo-o-xylene
1,4-bis-($\alpha$-chloroisopropyl)benzene
2,5-bis-(chloromethyl)-p-xylene
$\alpha,\alpha'$-dichloro-2-nitro-p-xylene
$\alpha,\alpha'$-dichloro-2,5-dicyano-p-xylene
$\alpha,\alpha'$-dichloro-4-carbomethoxy-o-xylene
$\alpha,\alpha'$-dichloro-$\alpha,\alpha'$-diphenyl-p-xylene
2,5-bis-(chloromethyl)-1,4-dimethoxybenzene
4,5-bis-(chloromethyl)-1,2-dimethoxybenzene
4,5-bis-(chloromethyl)-o-xylene
$\alpha,\alpha'$,2,3,5,6-hexachloro-p-xylene
1,4-bis-($\alpha$-chloroisopropyl)benzene
1,3-bis-($\alpha$-chloroperfluoroisopropyl)-2,4,5,6-tetrafluorobenzene
$\alpha,\alpha'$-2,4,5,6-hexachloro-m-xylene
1,4-bis-(difluorochloromethyl)-2,3,5,6-tetrafluorobenzene
1,2-bis-(difluorochloromethyl)-2,3,5,6-tetrachlorobenzene
1,4-bis-(chloromethyl)naphthalene
5,8-bis-(chloromethyl)tetralin
5,6-bis-(chloromethyl)indane
bis-(chloromethyl)durene
1,4-dibromo-1,2,3,4-tetrahydronaphthalene
1,4-dichloro-1,4-dihydronaphthalene
1,4-dichloro-2,3-diacetoxy-1,2,3,4-tetrahydronaphthalene
1,3-dichloroindane
2,5-bis-(chloromethyl)thiophene
2,3-bis-(chloromethyl)furan
2,5-bis-(chloromethyl)furan
3,4-bis-(chloromethyl)pyrrole
5,8-bis(chloromethyl)quinoline
5,8-bis-(chloromethyl)isoquinoline
5,6-bis-(chloromethyl)quinoline
6,7-bis-(chloromethyl)-4-chloroquinoline
9,10-bis-(chloromethyl)anthracene
9,10-bis-(chloromethyl)-1-methylanthracene
9,10-bis-(chloromethyl)phenanthrene 4,4'-bis-(chloromethyl)diphenyl ether
2,4'-bis-(chloromethyl)diphenyl ether
3,3'-bis-(chloromethyl)diphenyl ether
4,4'-bis-(difluorochloromethyl)-2,2',3,3',5,5',6,6'-octafluorodiphenyl ether
α,α,α,α',α',α'-hexachloro-p-xylene
α,α,α,α',α',α'-hexachloro-m-xylene
α,α,α',α'-tetrachloro-p-xylene
1,2,4,5-tetrakis(bromomethyl)benzene
1,4-bis-(α,α-dichlorobenzyl)benzene
4,4'-bis-(α,α-dichloromethyl)diphenyl ether
4,4'-bis-(α,α-dichlorobenzyl)diphenyl ether
terephthaloyl dichloride
isophthaloyl dichloride
4,4'-oxybis-(benzoyl chloride)

The olefinic compounds which may be employed in conjunction with the halogen-containing aromatic compounds to prepare various copolymers will have the following structural formula $$R_5CH=CR_6R_7$$

wherein $R_5$ is selected from the group consisting of hydrogen, a cyano radical, and an aryl group having from 6 to 10 carbon atoms.

$R_6$ is selected from the group consisting of hydrogen, a lower alkyl group having from 1 to 6 carbon atoms, and a COOR radical wherein R is a lower alkyl group having from 1 to 12 carbon atoms.

$R_7$ is selected from the group consisting of hydrogen, a CN radical, a $NO_2$ radical, a COOH radical, a lower alkyl group having from 1 to 6 carbon atoms, a $CH_2COOR$ radical and a COOR radical wherein R is a lower alkyl group having from 1 to 12 carbon atoms, a $CONH_2$ radical, a CONHR' or $CONR'_2$ radical wherein R' is a lower alkyl group having from 1 to 6 carbon atoms, or an aryl group having 6 to 10 carbon atoms.

Illustrative vinyl comonomers include:

styrene
p-chlorostyrene
methyl acrylate
methyl methacrylate
acrylamide
N,N-dimethyl acrylamide
acrylonitrile
diethyl itaconate
ethyl cinnamate
cinnamonitrile
fumaronitrile
omega-nitrostyrene When a comonomer is employed in preparing copolymeric products, the mole ratio of the halogen-containing aromatic compound to the olefinic comonomer will generally range from about 100:1 to 1:100, and preferably about 100:5 to 5:100.

The polymerization and copolymerization processes of this invention are advantageously carried out within a temperature range of about −30° to 300° C., preferably about 0° to 200° C. The pressure under which the reaction may be carried out can vary from about 1 to 1000 p.s.i.a., and it is preferably autogenous. For most purposes it is preferred to carry out the polymerization and copolymerization reactions in an inert atmosphere to prevent oxidation of the lower valent transition metal salt. Illustrative inert gases include nitrogen, argon, carbon dioxide, methane, helium and mixtures thereof, and the like. Although the reactions will proceed without agitation or stirring, some degree of agitation during the polymerization or copolymerization reaction has been found helpful. The time period for carrying out the reactions of this invention may vary over a wide range depending in part on other operation conditions employed. In general, however, the time period may range from about 1 minute up to about 48 hours with the preferred time being about 2 to 4 hours. The processes may also be carried in a continuous or semi-continuous basis. For economic reasons, the lower valent transition metal salt, which becomes oxidized during the course of the reaction, is recovered and reduced to its original lower valent state and recycled. Alternatively, continuous in situ regeneration of the lower valent transition metal salt is possible by maintaining an excess of reducing metal, e.g., zinc or chromium, in contact with the transition metal solution during the polymerization.

In accordance with the process of this invention, aromatic compounds having at least two substituents, in each of which there are one to three halogen atoms bonded to that substituent carbon atom attached to the aromatic ring, or a mixture of one or more such aromatic compounds, or a mixture of one or more such aromatic compounds and a vinyl comonomer, if copolymers are desired, is dissolved in a suitable dipolar aprotic solvent and added over a period ranging from a few seconds up to 1 hour at a temperature ranging from room temperature to about 200° C. to a stirred solution of an anhydrous lower-valence transition metal salt in an anhydrous dipolar aprotic solvent such as N,N-dimethylacetamide, also at a temperature from room temperature to about 200° C., and under a substantially oxygen-free inert atmosphere such as $N_2$. The reaction is continued for a period of about 1 to 24 hours with stirring at a temperature ranging from room temperature to about 200° C. After the reaction is completed the reaction mixture may be diluted with more dipolar aprotic solvent or with water to promote filtration, and the polymer present in removed by filtration, washed free of metal salts with more dipolar aprotic solvent or with water, extracted with a solvent for unreacted halogen-containing aromatic compound, by-products and low-polymers, and finally dried.

For the industrial application of the process of this invention, the spent chromium liquor, which is in its higher valence state ($CrCl_3$) as a result of the coupling-polymerization reaction, and which contains chlorine values from the halogen-containing aromatic compound undergoing the coupling reaction, is reprocessed. When this is done, use of water is avoided and only fresh dipolar aprotic solvent is employed to wash the polymer. Further, the halide salt of the transition metal is used which corresponds to the halogen-containing aromatic compound coupled e.g., chromous chloride is used with chlorine-containing aromatic compounds losing chlorine in the complexing reaction. The dipolar aprotic solvent solutions of the transition metal in its higher valence state ($CrCl_3$) are evaporated to obtain the dry transition metal salt and the recoverable dipolar aprotic solvent, which is recycled. The dry transition metal halide salt in its higher valence state, here $CrCl_3$, is again reduced with hydrogen at an elevated temperature and the lower valence metal salt $CrCl_2$ is obtained together with the corresponding hydrogen halide, both of which are recycled.

The recycle of chlorine values as HCl may be accomplished in two general ways. The recycled HCl may be fed directly to a chloromethylation reaction known to the art, such as the chloromethylation of 1,4-dimethoxybenzene, where in the presence of excess HCl and formaldehyde the following reaction takes place:

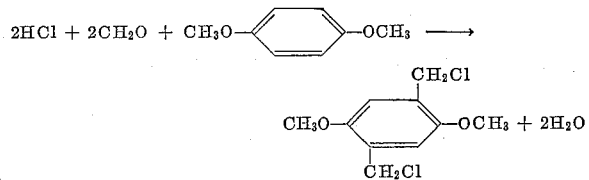

In other instances it is preferred to utilize the recycled HCl by burning it with air or oxygen to elemental chlorine and water in a Deacon Process type of operation. The chlorine thus obtained is then used to convert alkyl-aromatic compounds to bis-($\alpha$-chloroalkyl)aromatic compounds, for example p-xylene to $\alpha,\alpha'$-dichloro-p-xylene, which can then be coupled to poly(p-xylylene) in this process of this invention.

The invention will be more fully understood by reference to the following illustrative embodiments.

EXAMPLE I.—CONVERSION OF $\alpha,\alpha'$-DICHLORO-p-XYLENE TO POLY(p - XYLYLENE)[POLY(p - PHENYLENEDIMETHYLENE)]

Part A.—*Preparation of a ~0.9 N solution of anhydrous $CrCl_2$ in N,N - dimethylacetamide*

The preparation of solutions of anhydrous $CrCl_2$ in N,N - dimethylacetamide was carried out essentially as described by C. E. Castro (J. Am. Chem. Soc., 83, 3262 (1961) for the preparation of aqueous $CrSO_4$ solutions by the zinc-reduction of $Cr_2(SO_4)_3$ hydrate in water. In a typical preparation, 39.5 g. (0.25 mole) of anhydrous $CrCl_3$ was stirred under a nitrogen atmosphere in 270 ml. of N,N - dimethylacetamide (redistilled from $P_2O_5$ under $N_2$ and stored under $N_2$, B.P. 165–6° C.). To the lilac suspension was rapidly added 16.3 g. (g-atom) of 20 mesh granules of metallic zinc. Reaction commenced almost at once, accompanied by a temperature increase to about 80° C. and the development of a purple color in the solvent. After about one-half hour the purple color had changed to blue-green and the temperature had fallen to 55° C. Heat was applied and stirring was continued, with the temperature being maintained at 50–55° C. until the total elapsed time amounted to 2 hours. After cooling, the blue-green solution was pressure-filtered under nitrogen through a coarse-porosity sintered glass frit to remove unreacted zinc. The filtered solution was stored under nitrogen in a flask from which it could be withdrawn by hypodermic syringe. Samples of 1–2 ml. size were withdrawn each day before use and reacted under nitrogen with excess (20 ml.) of 0.25 M aqueous $FeCl_3$ solution; the ferrous iron formed was immediately titrated with standard ceric ammonium sulfate solution to the green ferric phenanthroline end point; N=0.93. Such solutions showed only minor decreases in strength over periods of several weeks. Contact with air gave an immediate color change from blue-green to brown.

Part B.—*Preparation of solutions of $CrCl_2$ in other aprotic solvents*

Solutions of $CrCl_2$ in other aprotic solvents were prepared in a similar manner by shaking 1.0 g. (6.4 millimoles) of anhydrous $CrCl_3$ under nitrogen with 1.1 g. (17 milligram-atoms) of zinc in 50 ml. of the solvent selected, at room temperature for about 16 hours. Titration as described above under Part A of the supernatant liquid from each test gave the results shown below in the table.

EXTENT OF REDUCTION OF $CrCl_3$ BY Zn IN VARIOUS APROTIC SOLVENTS

[16 hrs., room temperature]

| Run No. | Aprotic Solvent | Appearance of Supernatant | Percent Reduction to Cr(II) |
|---|---|---|---|
| 1 | Dimethyl sulfoxide | Light blue-green | 90.0 |
| 2 | N,N-dimethylacetamide | Light blue | 85.0 |
| 3 | Acetone | Bright lt. green | 76.0 |
| 4 | N,N-dimethylformamide | Dark green | 59.0 |
| 5 | Acetonitrile | Deep purple | 25.0 |

Alternatively, the presence of zinc chloride in the Cr(II) solutions may be avoided if $CrCl_3$ is reduced in solution with metallic Cr or if the $CrCl_2$ is prepared by hydrogen-reduction of anhydrous $CrCl_3$, and then dissolved in the solvent to be used.

Part C.—*Conversion of $\alpha,\alpha'$ - dichloro - p - xylene to poly-(p - xylylene) [poly(p - phenylenedimethylene)]*

The coupling-polymerization reaction was carried out in a 100-ml. three-necked round-bottom glass reaction flask which was equipped with a pressure-equalizing addition funnel, a reflux-condenser, a thermometer and a magnetic stirrer. Both the flask and the funnel were wrapped with heating tape, and the funnel was also provided with a thermometer. The entire system was well-flushed with nitrogen before use and nitrogen was supplied to the top of the reflux condenser at a small positive pressure (~½ in. of Nujol).

To the reaction flask, against a current of nitrogen, was added, by hypodermic syringe, 25 ml. of a 0.913 N N,N-dimethylacetamide solution of $CrCl_2$ (22.8 millimoles). Into the addition funnel was introduced 1.33 g. (7.6 millimoles) of $\alpha,\alpha'$ - dichloro - p - xylene (recrystallized from acetone-hexane before use, M.P. 98–100° C.) and 20 ml. of redistilled N,N - dimethylacetamide. Heat was then applied to both the reaction flask and the funnel. Nitrogen gas was slowly bubbled through the contents of the funnel for 10–20 min. to remove oxygen and to provide agitation during dissolution of the $\alpha,\alpha'$ - dichloro - p - xylene. After about 25 min., when the temperature of the $CrCl_2$ solution had been stabilized at 70±1° C., and the temperature of the $\alpha,\alpha'$ - dichloro - p - xylene solution in the funnel had also reached 70° C., the latter solution was allowed to flow as rapidly as possible into the former, with maximum stirring. Immediately the blue-green $CrCl_2$ solution in the flask turned to deep purple and solid began to separate. Within 3 minutes, with constant heat input to the reactor flask, the temperature of the reactants rose to 82° C. and then began to fall. The funnel was rinsed with 5 ml. additional redistilled N,N - dimethylacetamide and the rinse solution was immediately added to the reactants. The reactor was thereupon cooled by the external application of a stream of compressed air or nitrogen until the temperature reached 70° C. The reactants were then maintained at 70±1° C. for a total reaction time of 2 hours, with continued stirring. At the end of the 2 hr. period the contents of the flask were poured into 500 ml. of water. The solid present was collected, washed well with water and dried in vacuum at 35° C. A total of 0.79 g. (100%) of crude poly(p - xylene) was obtained as a light green powder. The crude material was extracted with acetone for 8 hrs. in a Soxhlet apparatus. Most of the green color was removed and 83.5% of the original solid, after drying in vacuo, remained as acetone-insoluble poly-(p - xylylene). The infrared absorption spectrum obtained with the acetone-insoluble polymer was essentially identical with a published spectrum for known poly(p - xylylene) (R. A. Nyquist, "Infrared Spectra of Plastics and Resins," The Dow Chemical Co., Midland, Mich., 2nd ed., May 3, 1961, Spectrum No. 124). The X-ray diffraction pattern of the polymer showed lines at 5.33 (very strong), 3.90 (very strong), and 2.79 A. (weak), as well as very weak lines at 3.50, 3.03, 2.70, and 2.30 A. (using Ni-filtered Cu radiation at 45 kilovolts, 15 milliamperes; Kr-filled Geiger tube operating at 1320 volts used as detector). The crystalline portion of the polymer is therefore the $\alpha$-form of poly(p - xylylene), and there is no detectable amount of the $\beta$-form present, which has a single spacing at 4.4 A. (C. H. Brown and A. C. Farthing, J. Chem. Soc., 3270 (1953); L. A. Errede and R. S Gregorian, J. Polymer Sci., 60, 21 (1962)). The polymer was completely soluble in benzyl benzoate within 4 min. at 305° C. and exhibited an inherent viscosity of 0.095 (determined by the method described by T. E. Young, U.S. Patent 2,999,820, Sept. 12, 1961, and by J. R. Schaefgen, J. Polymer Sci., 41, 133 (1959)). The polymer began to soften without entirely melting at 238°–245° C. on a modified Dennis bar similar to the one described in the literature (W. R. Sorenson and T. W. Campbell, "Preparative Methods of Polymer Chemistry," Interscience Publishers, Inc., New York, N.Y., 1961, p. 49). At a temperature of 412° C. specimens melt at once to a clear brown melt, when placed on the Dennis bar.

EXAMPLE II.—CONVERSION OF 2,5 - bis - (CHLOROMETHYL) - p - XYLENE TO POLY(2,5 - DIMETHYL - p - PHENYLENEDIMETHYLENE)

In an apparatus and in a manner essentially similar to that described in Example I, 1.54 g. (7.6 millimoles) of 2,5 - bis - (chloromethyl) - p - xylene (prepared by the method of J. H. Wood, M. A. Perry and C. C. Tung, J. Am. Chem. Soc., 72, 2989), M.P. 132°–132.5° C.), was dissolved in 25 ml. of redistilled N,N - dimethylacetamide and rapidly added to 25 ml. of a 0.91 N N,N - dimethylacetamide solution of $CrCl_2$ (22.8 millimoles). After 2 hrs. at 70° C., a total of 1.00 g. (100%) of crude poly- (2,5 - dimethyl - p - phenylenedimethylene) was obtained which, after 8 hrs. extraction with acetone in a Soxhlet apparatus and drying in vacuo, afforded an 81% yield of acetone-insoluble high polymeric poly(2,5 - dimethyl - p-phenylenedimethylene) as a white powder. This polymer was insoluble after heating 30 min. in benzyl benzoate under nitrogen at 305° C. but was completely soluble in Arochlor 1254 (a mixture of chlorinated biphenyls) after 10 minutes at 305° C., and exhibited an inherent viscosity of 0.33 (0.41 g. per 100 ml. of solvent) determined as described in Example I. The X-ray diffraction pattern of the polymer showed lines at 5.95 (s), 4.98 (m), 3.77 (s) and 3.35 A. (w), as well as very weak lines at 4.32, 2.63, and 2.15 A. The polymer melted sharply at 336°–338° C. to a colorless melt on a Dennis bar. The infrared absorption spectrum of the polymer contained a strong band at 880 cm.$^{-1}$ attributable to isolated aromatic ring hydrogen atoms.

EXAMPLE III.—CONVERSION OF bis - (CHLOROMETHYL)DURENE TO POLY(2,3,5,6 - TETRAMETHYL - p - PHENYLENEDIMETHYLENE)

In an apparatus and in a manner essentially the same as that described in Example I, 1.76 g. (7.6 millimoles) of bis - (chloromethyl)durene (prepared by the method of M. J. Rhoad and P. J. Flory, J. Am. Chem. Soc., 72, 2216 (1950), M.P. 195–196.5° C.) was dissolved in 25 ml. redistilled N,N - dimethylacetamide and added rapidly to 25 ml. of a 0.91 N N,N - dimethylacetamide solution of $CrCl_2$ (22.8 millimoles). After 2 hrs. at 70° C., a total of 1.24 g. (102% yield) of crude poly(2,3,5,6 - tetramethyl - p - phenylenedimethylene) was obtained, which yielded 1.13 g. (96%) of white, acetone insoluble high polymer. This polymer was insoluble after heating 30 minutes in benzyl benzoate at 305° C., or 40 minutes in boiling Arochlor 1254 (365°–390° C.). The X-ray diffraction pattern showed lines at 6.06 (m, broad), 5.60 (vw), 4.13 (w), 3.28 (vw) and 2.71 A. (vw). The polymer melts with rapid blackening and decomposition on a Dennis bar at 500° C.

EXAMPLE IV—CONVERSION OF 1,4 - bis - ($\alpha$-CHLOROISOPROPYL)BENZENE TO POLY($\alpha,\alpha,\alpha',\alpha'$ - TETRAMETHYL - p - PHENYLENEDIMETHYLENE)

1,4 bis - ($\alpha$ - chloroisopropyl)benzene was prepared from diethyl terephthalate by the method of Yu. V. Mitin (Zhur. Obshchei Khim., 28, 3302 (1958)).

In an apparatus and in a manner essentially similar to that described in Example I, 2.28 g. (9.9 millimoles) of 1,4 - bis - ($\alpha$ - chloroisopropyl)benzene (M.P. 67.5–71.5° C. corr.) was dissolved at room temperature in 36 ml. redistilled N,N - dimethylacetamide and added rapidly to 36.6 ml. of a 0.82 N N,N - dimethylacetamide solution of $CrCl_2$ (30 millimoles). After 2 hrs. at 28°–35° C., a total of 1.58 g. (99.5%) of crude poly($\alpha,\alpha,\alpha',\alpha'$-tetramethyl - p - phenylenedimethylene) was obtained, which after extraction with acetone for 8 hrs. in a Soxhlet apparatus, and drying in vacuo, afforded a 93.5% yield of acetone-insoluble high polymeric poly($\alpha,\alpha,\alpha',\alpha'$ - tetramethyl - p - phenylenedimethylene) as a white powder.

*Analysis.*—Calculated for $(C_{12}H_{16})_n$: C, 89.94%; H, 10.07%. Found: C, 87.40%; H, 9.78%.

The high polymer was insoluble after 30 min. in benzyl benzoate at 305° C. but dissolved rapidly in boiling Arochlor 1254 (B.P. 365°–390° C.). In Arochlor 1254 at 328° C it had an inherent viscosity of 0.086 (0.38 g. per 100 ml. solvent), determined as in Example I. When particles of the polymer are placed on a Dennis bar at temperatures between 375°–385° C. they volatilize almost completely at once to form a white fog. The volatilization is accompanied by some discoloration of the polymer. At temperatures as low as 320° C. volatilization also occurs but appreciable polymer remains behind and darkens. The X-ray scattering pattern showed lines as follows: 5.88 (vs), 5.12 (s), 3.26 (w) and 2.13 A. (vw).

A sample of the polymer was placed in a vacuum sublimation apparatus which was then evacuated and strongly heated with a Bunsen burner. Decomposition of the polymer specimen was again observed and at the same time a white solid began to collect on the cold finger collector of the sublimation apparatus. This white solid was insoluble in acetone and in turn exhibited the same decomposition behavior at 375–385° C. on the Dennis bar as did the original polymer. This result may be interpreted as evidence that the poly($\alpha,\alpha,\alpha',\alpha'$-tetramethyl-p-xylylene) obtained in this example decomposes at 375–385° C. to form monomeric $\alpha,\alpha,\alpha',\alpha'$-tetramethylquinodimethane, which is stable in the gas phase, and passes through the vacuum of the sublimation apparatus to the cold finger collector where it condenses and immediately repolymerizes to poly($\alpha,\alpha,\alpha',\alpha'$-tetramethyl-p-xylylene).

EXAMPLE V.—CONVERSION OF $\alpha,\alpha'$-DIBROMO-o-XYLENE TO POLY(o-PHENYLENEDIMETHYLENE) [POLY(o-XYLENE)]

In an apparatus and in a manner essentially similar to that described in Example I, 2.11 g. (8 millimoles) of $\alpha,\alpha'$-dibromo-o-xylene (recrystallized from n-hexane before use, M.P. 95°–96° C.) was dissolved in 25 ml. redistilled N,N-dimethylacetamide and rapidly added to 21 ml. of a 0.95 N N,N-dimethylacetamide solution of $CrCl_2$ (20 millimoles). After 2 hrs. at 70° C. a total of 0.3 g. of a dark brown crude polymer was obtained. Dissolution of the crude polymer in hot toluene, followed by precipitation in methanol and drying in vacuo yielded 0.2 g. (24%) of purified solid poly(o-phenylenediamethylene) softening at 93°–97° C. to a viscous melt on a hot stage microscope. Poly(o-xylene) has been reported to melt at ~110° C. by L. A. Errede, J. Polymer Sci., 49, 253 (1961).

EXAMPLE VI.—CONVERSION OF 4,5-BIS(CHLOROMETHL)-o-XYLENE TO POLY(4,5-DIMETHYL-o-PHENYLENEDIMETHYLENE)

The preparation of 4,5-bis(chloromethyl)-o-xylene was carried out according to the directions of J. von Braun and J. Nelles, Ber., 67, 1094 (1934) except that twice as much formaldehyde solution was used and the reaction time was extended to 27 hrs., M.P. 103°–104° C.; Von Braun and Nelles reported a M.P. of 105°–106° C.

In an apparatus and in a manner similar to that described in Example I, 1.54 g. (7.6 millimoles) of 4,5-bis-(chloromethyl)-o-xylene was dissolved in 25 ml. redistilled N,N-dimethylacetamide solution and rapidly added to 25 ml. of a 0.91 N N,N-dimethylacetamide solution of $CrCl_2$ (22.8 millimoles). After 2 hrs. at 70° C., a total of 1.00 g. (100%) of crude poly(4,5-dimethyl-o-phenylenedimethylene) was obtained, which yielded 0.742 g. (74.2%) of acetone-insoluble high polymeric poly(4,5-dimethyl-o-phenylenedimethylene) as a white powder.

*Analysis.*—Calculated for $(C_{10}H_{12})_n$: C, 90.85%; H, 9.15%. Found: C, 90.91%; H, 9.09%.

The polymer dissolved completely within 2 min. in benzyl benzoate, at 305° C., and exhibited an inherent viscosity of 0.095 (0.39 g. per 100 ml. solvent) determined as described in Example I. The X-ray scattering pattern showed lines as follows: 11.63 (m), 5.83 (m), 4.46 (w), 4.15 (vw), 3.83 (m), and 3.17, 2.80 and 2.58 A. (vw). The polymer melted sharply at 300° C. to a colorless melt when placed on a Dennis bar at 300° C.

EXAMPLE VII.—CONVERSION OF 5,6-BIS-(CHLOROMETHYL)INDANE TO POLY(5,6-INDANYLENEDIMETHYLENE)

*Part A*

The synthesis of 5,6-bis-(chloromethyl)indane was carried out by chloromethylating indane according to the method described by G. M. Badger, J. W. Cook and G. W. Crosbie, J. Chem. Soc., 1432 (1947) for the chloromethylation of tetraline. From 348 g. (2.96 moles) of indane (redistilled before use B.P. 175.0°–175.5° C. (758 mm. Hg)) there was obtained on distillation a liquid product comprising three fractions:

1st fraction, 43.6 g., B.P. 140–152° C. (1.1–1.5 mm. Hg)
2nd fraction, 219.6 g., B.P. 155–165° C. (0.9–1.3 mm. Hg)
3rd fraction, 73.7 g., B.P. 160–177° C. (0.9–1.5 mm. Hg)

From the second fraction, by recrystallization from petroleum ether, there was isolated 93.7 g. (14.7%) of solid, M.P. 51°–69° C. Repeated recrystallization from acetone and then ethanol yielded 34.3 g. of white needles, M.P. 73°–74.5° C. Several further recrystallizations from ethanol gave an analytical sample, M.P. 74.5°–75.5° C., corr.

*Analysis.*—Calculated for $C_{11}H_{12}Cl_2$: C, 61.41%; H, 5.63%; Cl, 32.96%. Found: C, 61.25%; H, 5.58%; Cl, 33.13%.

The assignment of the 5,6-bis-(chloromethyl)indane structure to the compound is based on the above analysis and on its nuclear magnetic resonance and infrared spectra. The NMR spectrum showed a singlet peak for two equivalent aromatic ring protons, at a tau value of 3.1, consistent only with a 5,6- or a 4,7-bis-(chloromethyl)-indane structure, eliminating the possible 4,5- and 4,6-bis-(chloromethyl)indane structures. The infrared spectrum showed a medium intensity band at 884 cm.$^{-1}$, associated with isolated ring hydrogen atoms, which is consistent only with the assigned 5,6-bis-(chloromethyl)-indane structure.

*Part B.—Preparation of poly(5,6-indanylenedimethylene)*

1. POLYMERIZATION AT 70° C. USING 50% EXCESS $CrCl_2$

In an apparatus and in a manner essentially similar to that described in Example I, 1.68 g. (7.83 millimoles) of 5,6-bis-(chloromethyl)indane was dissolved in redistilled N,N-dimethylacetamide and rapidly added to 25 ml. of a 0.94 N N,N-dimethylacetamide solution of $CrCl_2$ (23.5 millimoles). After 2 hrs. at 70° C., a total of 1.10 g. (97.4%) of crude poly(5,6-indanylenedimethylene) was obtained as a friable white solid, which afforded a 76.5% yield of white insoluble high polymer after 6 hrs. extraction with acetone in Soxhlet apparatus.

*Analysis.*—Calculated for $(C_{11}H_{12})_n$: C, 91.61%; H, 8.39%. Found: C, 90.00%; H, 8.21%.

The infrared spectrum obtained with the high polymer contained a band at 872 cm.$^{-1}$ for isolated aromatic ring hydrogens. The polymer was swelled by benzyl benzoate at 205° C. and dissolved completely within 5 min. in that solvent at 305° C. At 305° C. and a concentration of 0.39 g. per 100 ml. benzyl benzoate it exhibited an inherent viscosity of 0.11, determined as in Example I. The X-ray scattering diagram showed lines at 12.45 (w), 8.85 (vw), 6.15 (w), 5.87 (vw), 5.40 (vw), 4.55 (vw), 3.92 (vw), 3.80 (vw), 2.93 (vw), 2.84 (vw) and 2.73 A. (vw). The polymer melted sharply to a colorless melt which slowly turned brown when placed on a Dennis bar at 302° C.

2. POLYMERIZATION AT 70° C. USING 100% EXCESS $CrCl_2$

In an apparatus and in a manner essentially similar to that described in Example I, 1.72 g. (8 millimoles) of 5,6-bis-(chloromethyl)indane was dissolved in 25 ml. redistilled N,N-dimethylacetamide and added rapidly to 35 ml. of a 0.925 N N,N-dimethylacetamide solution of $CrCl_2$ (32 millimoles). After 2 hrs. at 70° C. there was obtained a crude poly(5,6-indanylenedimethylene) which, after washing well with water, was immediately transferred to a Soxhlet extractor and extracted 4 hrs. with acetone and finally dried. A total of 0.75 g. (65.2%) of acetone-insoluble high polymer was obtained as a white powder. This polymer melted at 305–312° C. on a Dennis bar. It had an inherent viscosity of 0.05 in benzyl benzoate at 305° C. (0.39 g. per 100 ml. solvent), determined as described in Example I.

*Analysis.*—Calculated for $(C_{11}H_{12})_n$: C, 91.61%; H, 8.39%. Found: C, 90.85%; H, 8.30%.

EXAMPLE VIII.—CONVERSION OF 1,4-DIBROMO-1,2,3,4-TETRAHYDRONAPHTHALENE TO POLY(1,4-(1,2,3,4-TETRAHYDRO)NAPHTHYLENE)

In an apparatus and in a manner essentially similar to that described in Example I, 2.3 g. (8 millimoles) of freshly-recrystallized 1,4-dibromo-1,2,3,4-tetrahydronaphthalene (hexane M.P. 92–93° C.) prepared by the method of A. G. Anderson, Jr., and R. E. Anderson, J. Org. Chem., 22, 1197 (1957) was dissolved in 30 ml. redistilled N,N-dimethylacetamide and rapidly added to 25 ml. of a 0.948 N N,N-dimethylacetamide solution of $CrCl_2$ (23.7 millimoles). After 2 hrs. at 70° C. a total of 0.94 g. (90.4%) of crude polymer was obtained, which afforded a 77.5% yield of white, insoluble high polymer after 4 hrs. extraction with acetone in a Soxhlet apparatus.

*Analysis.*—Calculated for $(C_{10}H_{10})_n$: C, 92.26%; H, 7.74%. Found: C, 91.29%; H, 7.87%; Br, 0.45%.

The polymer melted at 205°–215° C. with browning to a viscous melt on a hot stage microscope. The X-ray diffraction pattern showed three broad lines at 6.47 (m), 4.11 (vw) and 2.13 A. (vw). The polymer dissolved completely in benzyl benzoate within 3 min. at 222° C.; it exhibited an inherent viscosity at 222° C. in benzyl benzoate of 0.25 (0.42 g. per 100 ml. solvent), determined as in Example I.

EXAMPLE IX.—CONVERSION OF α,α'-DIBROMO-m-XYLENE TO POLY(m-PHENYLENEDIMETHYLENE) POLY(m-XYLYLENE)

In an apparatus and in a manner essentially similar to that described in Example I, 2.01 g. (7.6 millimoles) of α,α'-dibromo-m-xylene (and recrystallized from n-hexane before use M.P. 76.2°–76.8° C.) was dissolved in 25 ml. of redistilled N,N-dimethylacetamide and rapidly added to 25 ml. of a 0.912 N N,N-dimethylacetamide solution of $CrCl_2$ (22.8 millimoles). After 2 hrs. at 70° C., a total of 0.663 g. (84%) of crude polymer was obtained, which yielded 0.252 g. (38%) of off-white acetone-insoluble high polymer. The polymer was completely soluble in benzyl benzoate at room temperature. It melted at 97°–98° C. on a hot stage microscope melting point apparatus to a viscous melt.

EXAMPLE X.—CONVERSION OF 4,6-BIS-(CHLOROMETHYL)-m-XYLENE TO POLY(4,6-DIMETHYL-m-PHENYLENEDIMETHYLENE)

*Part A.—Polymerization at 70° C. using 45% excess $CrCl_2$*

In an apparatus and in a manner essentially similar to that described in Example I, 1.34 g. (6.8 millimoles) of 4,5-bis-(chloromethyl)-m-xylene (recrystallized from n-hexane before use, M.P. 95–96° C.) was dissolved in 22.5 ml. redistilled N,N-dimethylacetamide and rapidly added to 22 ml. of a 0.90 N N,N-dimethylacetamide solution of $CrCl_2$ (19.8 millimoles). After 2 hrs. at 70° C. a total of 0.852 g. (93.5%) crude poly(4,6-dimethyl-m-xylylene)

was obtained which afforded a 70% yield of acetone-insoluble high polymer melting at 135°–138° C. to a viscous liquid on a hot stage microscope melting point apparatus. The polymer was completely soluble in benzyl benzoate at room temperature. The X-ray scattering diagram showed lines at 8.68 (vs), 7.90 (m), 4.98 (m), 4.25 (w), 3.89 (m), 3.48 (m), 3.32 (w) and 2.88 A. (vw). The polymer dissolved within 1 min. in benzyl benzoate at 222° C. but a small amount of gel prevented the determination of a reliable inherent viscosity.

*Part B.—Effect of polymerization temperature and amount of excess $CrCl_2$ on yield and inherent viscosity of poly(4,6-dimethyl-m-xylylene)*

Several additional experiments were carried out in which the polymerization temperature was varied. These polymerizations were all done in the apparatus in the manner described in Example I. In each experiment 1.42 g. (7 millimoles) of 4,6-bis-(chloromethyl)-m-xylene in 20 ml. redistilled N,N-dimethylacetamide was added to the $CrCl_2$ in N,N-dimethylacetamide, both solutions being at the reaction temperature selected. 5 ml. additional N,N-dimethylacetamide was used to wash in the bis-(chloromethyl)-aromatic compound. Polymerization times were all 2 hours.

125° C. and rapidly added to 30.3 ml. of a 0.925 N N,N-dimethylacetamide solution of $CrCl_2$ (28 millimoles) at 125° C. After 2 hrs. at 125° C. the crude poly(2,4,6-trimethyl-m-xylylene) was isolated, washed with water and immediately placed in a Soxhlet extractor where it was extracted 6 hrs. with acetone and then dried. A total of 1.005 g. of acetone-insoluble poly(2,4,5-trimethyl-m-xylylene) (98.5% yield) was obtained as a white powder. This polymer was insoluble after 30 min. in benzyl benzoate at 222° C. but dissolved in 2 min. at 305° C. and had an inherent viscosity of 0.04 (0.39 g. per 100 ml. solvent), determined as described in Example I.

The polymer melted at 277° C. on a Dennis bar.

*Analysis.*—Calculated for $(C_{11}H_{14})_n$: C, 90.35%; H, 9.65%. Found: C, 89.03%; H, 8.87%.

EXAMPLE XII.—CONVERSION OF 5,8-BIS-(CHLOROMETHYL)TETRALIN TO POLY[5,8 - (1,2,3,4 - TETRAHYDRO)NAPHTHYLENEDIMETHYLENE]

In an apparatus and in a manner essentially similar to that described in Example I, 1.67 g. (7.3 millimoles) of 5,8-bis-(chloromethyl)tetralin (prepared by the method of G. M. Badger, J. W. Cook and G. W. Crosbie, J. Am. Chem. Soc., 1432 (1947), M.P. 118°–118.5° C.) was dis-

| Run No. | CrCl₂ Solution | | | | Reaction Temp., ° C. | Extracted Yield, percent [1] | Ninh [2] | Appearance |
|---|---|---|---|---|---|---|---|---|
| | N | Ml. | mM | Percent excess | | | | |
| 1 | 0.925 | 30.3 | 28 | 100 | 26 | trace | | Dark solid. |
| 2 | 0.925 | 30.3 | 28 | 100 | 70 | 78.8 | 0.055 | White powder. |
| 3 | 0.925 | 30.3 | 28 | 100 | 125–8 | 81.0 | 0.20 | Granules and sheets faintly green. |

[1] After 6 hrs. extraction with acetone in a Soxhlet apparatus.
[2] 0.42 g. per 100 ml. benzyl benzoate.

EXAMPLE XI.—CONVERSION OF BIS-(CHLOROMETHYL)MESITYLENE TO POLY(2,4,6 - TRIMETHYL-m-XYLYLENE)

*Part A.—Polymerization at 70° C. using 44% excess $CrCl_2$*

In an apparatus and in a manner essentially similar to that described in Example I, 1.51 g. (6.95 millimoles) of bis-(chloromethyl)mesitylene (M.P. 103°–104° C.) was dissolved in 25 ml. of redistilled N,N-dimethylacetamide and rapidly added to 21 ml. of a 0.910 N N,N-dimethylacetamide solution of $CrCl_2$ (20 millimoles). After 2 hrs. at 70° C., a total of 0.970 g. (96.9%) of crude, light brown poly(2,4,6-trimethyl-m-xylylene) was obtained, which afforded a 88% yield of buff acetone-insoluble high polymer. The polymer melted sharply to a brown melt when placed on a Dennis bar at 237°–240° C.

*Part B.—Polymerization at 125° C. using 100% excess $CrCl_2$*

In an apparatus and in a manner essentially similar to that described in Example I, 1.52 (7 millimoles) of bis-(chloromethyl)mesitylene (the material used in Part A, above, was recrystallized from ethanol using Darco B Carbon to decolorize, M.P. 103°–106° C.) was dissolved in 25 ml. redistilled N,N-dimethylacetamide heated to solved in 25 ml. redistilled N,N-dimethylacetamide and rapidly added to 25 ml. of a 0.87 N N,N-dimethylacetamide solution of $CrCl_2$ (22 millimoles). After 2 hrs. at 70° C. a total of 1.13 g. (98%) of a crumbly, faintly green solid was obtained, which afforded, after 5¼ hrs. extraction was acetone in a Soxhlet apparatus and drying in vacuo, an 86.6% yield of off-white, acetone-insoluble high polymer as a crumbly solid.

*Analysis.*—Calculated for $(C_{12}H_{14})_n$: C, 91.08%; H, 8.92%. Found: C, 90.94%; H, 8.85%.

The X-ray diffraction pattern showed lines as follows: 7.77 (w), 6.97 (vw), 6.47 (vw), 5.94 (w), 5.40 (w), 4.39 (m), 3.86 (w) and 3.72 A. (w). The polymer dissolved within 3 min. in Arochler 1254 at 328° C. and had an inherent viscosity of 0.25 (0.39 g. per 100 ml. solvent), determined as in Example I. It melted sharply to a clear brown melt when placed on a Dennis bar at 345°–348° C.

EXAMPLE XIII.—CONVERSION OF 1,4-BIS-(CHLOROMETHYL)NAPHTHALENE TO POLY(1,4-NAPHTHALENEDIMETHYLENE)

In an apparatus and in a manner essentially similar to that described in Example I, there was obtained from reacting 1.69 g. (7.5 millimoles) of 1,4-bis-(chloromethyl)naphthalene (prepared by the method of G.M. Badger, J. W. Cook and C. W. Crosbie, J. Chem. Soc., 1432 (1947), M.P. 146°–147.5° C.) in 25 ml. redistilled N,N-dimethylacetamide with 25 ml. of a 0.90 N N,N-dimethylacetamide solution of $CrCl_2$ (22.5 millimoles), after 2 hrs. at 70° C., a total of 1.18 (102%) of crude poly-(1,4-naphthylenedimethylene) as a brittle, faintly green solid, which after extraction 5¼ hrs. with acetone in a Soxhlet apparatus, followed by drying in vacuo, afforded in 80% yield of acetone-insoluble high polymeric poly (1,4-naphthylenedimethylene) as a friable white solid. The high polymer dissolved completely in 8 min. in Arochlor 1254 at 305° C. but was only partly soluble in benzyl benzoate after 25 min. at this temperature. The high polymer had an inherent viscosity of 0.21 (0.40 g. per 100 ml. solvent) in Arochlor 1254 at 305° C. determined as in Example I. On the Dennis bar it melted sharply at 335°–338° C. to a colorless melt which rapidly turned brown. The X-ray diffraction pattern showed lines as follows: 6.82 (w), 5.81 (w), 5.11 (w), 4.67 (vw), 3.93 (s), 3.41 (vw, broad).

EXAMPLE XIV.—CONVERSION OF α,α′,2,3,5,6-HEXACHLORO-p-XYLENE TO POLY(2,3,5,6-TETRACHOLORO-P-PHENYLENEDIMETHYLENE)

In an apparatus and in a manner essentially similar to that described in Example I, 2.38 g. (7.6 millimoles) of α,α′, 2,3,5,6-hexachloro-p-xylene (recrystallized from benzenehexane, M.P. 181°–181.5° C., corr.) was dissolved in 25 ml. of redistilled N,N-dimethylacetamide and rapidly added to 25 ml. of a 0.912 N N,N-dimethylacetamide solution of $CrCl_2$ (22.8 millimoles). After 2 hrs. at 70° C. a total of 1.58 g. (101%) of crude poly(2,3,5,6-tetrachloro-p-phenylenedimethylene), was obtained, which after 8 hrs. extraction with acetone in a Soxhlet apparatus and drying in vacuo, afforded a 93.5% yield of acetone-insoluble poly(2,3,5,6-tetrachloro-p-phenylenedimethylene) as a white powder.

*Analysis.*—Calculated for $(C_8H_4Cl_4)_n$: C, 39.70%; H, 1.67%; Cl, 58.61%. Found: C, 39.46%; H, 1.57%; Cl, 58.82%.

The high polymer was insoluble in benzyl benzoate and Arochlor 1254 at 305° C. and also insoluble in boiling Arochlor 1254 (B.P. 365–390° C.). The X-ray diffraction pattern showed a series of very weak bands at 8.04 (broad, 4.25, 3.92, 3.68, 3.29, 3.21, 2.84, 2.70, 2.47 and 2.10 A. On the Dennis bar the high polymer turned brown without melting at 525° C.

EXAMPLE XV.—CONVERSION OF 4,4′-BIS-(CHLOROMETHYL)DIPHENYL ETHER TO POLY[p,p′-OXIDODI(PHENYLMETHYLENE)]

Part A.—*Polymerization at 70° C. using 50% excess* $CrCl_2$

In an apparatus and in a manner similar to that described in Example I, 2.00 g. (7.5 millimoles) of 4,4′-bis-(chloromethyl)-diphenyl ether (recrystallized from methanol before use, M.P. 62°–63° C.) was dissolved in 25 ml. of redistilled N,N-dimethylacetamide and rapidly added to 25 ml. of a 0.90 N N,N-dimethylacetamide solution of $CrCl_2$ (22.5 millimoles). After 2 hrs. at 70° C., a total of 1.46 g. (99.3%) of crude poly(p,p′-oxidodi(phenylmethylene) was obtained as a pale green powder, which after extraction for 7½ hrs. with acetone in a Soxhlet apparatus, and drying in vacuum, afforded a 73.5% yield of acetone-insoluble high polymeric poly[p,p′-oxidodi (phenylmethylene)] as a pale green powder. The high polymer softened at 185–190° C. on a hot stage microscope to a viscous melt. The polymer gave an X-ray scattering pattern with lines at 5.54 (w), 4.62 (vs), 4.30 (vw), 4.15 (s), 3.23 (w) and 2.84 A. (vw).

The high polymer was partly soluble in benzyl benzoate at room temperature and completely soluble at 138° C. It had an inherent viscosity of 0.09 in benzyl benzoate at 222° C. (0.42 g. per 100 ml. solvent), determined as described in Example I.

Part B.—*Polymerization at 125° C. using 100% excess* $CrCl_2$

In an apparatus and in a manner similar to that described in Example I, 1.87 g. (7 millimoles) of 4,4′-bis-(chloromethyl)-diphenyl ether in 25 ml. redistilled N,N-dimethylacetamide at 125° C. was added rapidly to 30.3 ml. of a 0.925 N N,N-dimethylacetamide solution of $CrCl_2$ (28 millimoles) also at 125° C. After 2 hrs. at 123–128° C. the crude poly[p,p′-oxidodi(phenylmethylene)] was isolated and washed well with water. It was immediately transferred to a Soxhlet extractor, extracted 6 hrs. with acetone and finally dried. A total of 1.37 g. (90% yield) of acetone-insoluble high polymer was obtained as a pale green solid, containing some hard granules. The polymer melted at 186° C. on a Dennis bar. It was not soluble in benzyl benzoate after 30 min. at both 222° and 305° C.

EXAMPLE XVI.—CONVERSION OF 2,5-BIS-(CHLOROMETHYL) - 1,4 - DIMETHOXYBENZENE TO POLY(2,5 - DIMETHOXY - p - PHENYLENEDIMETHYLENE)

In an apparatus and in a manner essentially similar to that described in Example I, 1.7 g. (7.2 millimoles) of 2,5-bis-(chloromethyl)-1,4-dimethoxybenzene (prepared by the method of Brunner, U.S. Patent 1,887,396, 1933, as modified by J. H. Wood and R. E. Gibson, J. Am. Chem. Soc., 71, 393 (1949); M.P. 165°–165.5° C.) was dissolved in 25 ml. of redistilled N,N-dimethylacetamide and added rapidly to 25 ml. of an 0.86 N N,N-dimethylacetamide solution of $CrCl_2$ (21.6 millimoles). After 2 hrs. at 70° C., a total of 1.07 g. (90%) of crude poly (2,5-dimethoxy-p-phenylenedimethylene) was obtained as a white powder which, after 6½ hrs. extraction with acetone in a Soxhlet apparatus and drying in vacuum afforded a 82.5% yield of acetone-insoluble high polymeric poly(2,5-dimethoxy-p-phenylenedimethylene) as a white powder at 233°–237° C. in a hot stage microscope to a viscous melt. The high polymer reported here was completely soluble in benzyl benzoate at 205° C., but not at 138° C. In benzyl benzoate at 222° C. it dissolved completely in 3 min., and exhibited an inherent viscosity of 0.47 (0.42 g. per 100 ml. solvent) determined as described in Example I.

The X-ray diffraction pattern for the high polymer showed lines as follows: 5.83 (m), 4.87 (vw), 4.33 (w), 3.92 (s), 3.47 (w), 3.18 (vw), 2.68 (vw), 2.33 A. (vw).

A series of similar polymerization runs were carried out essentially as described above except that the polymerization conditions were varied (time, temperature and ratio of $CrCl_2$ to dihalide). The experiments are summarized in Table I.

It is evident from the table that the higher yields and higher molecular weights are obtained at room temperature rather than at 70° C. and that use of $CrCl_2$ at a 100% excess rather than a 25% excess, based on 1 mole of $CrCl_2$ per atom of chlorine in the bis-(halomethyl) aromatic compound, provides higher molecular weight and higher yield.

TABLE I.—EFFECT OF REACTION TIME, TEMPERATURE AND AMOUNT OF CrCl₂ ON COUPLING OF 2,5-BIS-(CHLOROMETHYL)-1,4-DIMETHOXYBENZENE IN DMAc SOLUTION TO POLY(2,5-DIMETHOXY-p-PHENYLENEDIMETHYLENE)

Amount of 2,5-bis-(chloromethyl)-1,4-dimethoxybenzene taken: 1.90 g. (8.1 mmoles) in 25 ml. redistilled N,N-dimethylacetamide.
CrCl₂: prepared by Zn-reduction of anhydrous CrCl₃ in redistilled N,N-dimethylacetamide.

| Run No. | CrCl₂ solution | | | Reaction Conditions | | Polymer Yield, percent | | Eta-inherent (extracted polymer [2]) |
|---|---|---|---|---|---|---|---|---|
| | N | Ml. | CrCl₂, mmoles | Temp., °C. | Time, min. | Crude | Extracted [1] | |
| 1 | 0.852 | 24.0 | 20.4 | 70 | 5.5 | 92.5 | 77.2 | 0.50 |
| 2 | 0.852 | 24.0 | 20.4 | 70 | 10 | 93.9 | 80.7 | 0.56 |
| 3 | 0.852 | 24.0 | 20.4 | 70 | 20 | 96.3 | 85.4 | 0.50 |
| 4 | 0.828 | 24.2 | 20.0 | 70 | 60 | 96.2 | 84.6 | 0.53 |
| 5 | 0.852 | 24.0 | 20.4 | 70 | 120 | 94.1 | 82.0 | 0.59 |
| 6 | 0.815 | 25.0 | 20.4 | 35 | 120 | 103.5 | 96.6 | 0.80 |
| 7 | 0.828 | 24.2 | 20.0 | 150 | 120 | 96.3 | 88.3 | 0.16 |
| 8 | 0.95 | 34.0 | 32.0 | 35 | 120 | 96.3 | 93.1 | 1.04 |

[1] Extracted 2 hrs. with acetone in a Soxhlet apparatus, until extract showed no cloudiness on dilution with water.
[2] Viscosity determined in benzyl benzoate (0.42 g. per 100 ml. solvent) at 222° C. as described in Example I.

EXAMPLE XVII.—CONVERSION OF 2,5-BIS-(CHLOROMETHYL) - 1,4 - DI-n-BUTOXYBENZENE TO POLY(2,5 - DI-n-BUTOXY - p - PHENYLENEDIMETHYLENE)

Part A.—*Synthesis of 2,5-bis(chloromethyl)-1,4-di-n-butoxybenzene*

This compound was prepared by twice chloromethylating 1,4-di-n-butoxybenzene according to the method described by J. H. Wood and R. E. Gibson, J. Am. Chem. Soc., 71, 393 (1949), for the bis-(chloromethylation) of 1,4-dimethoxybenzene. The product obtained melted at 83.4°–84.5° C., in good agreement with the melting point of 81–2° C. reported by N. N. Mel'nikov and M. V. Prilutskaya, Zhur. Obshchei Khim., 29, 3746 (1949) for this same compound by another chloromethylation procedure.

Part B.—*Preparation of poly(2,5-di-n-butoxy-p-phenylenedimethylene)*

In an apparatus and in a manner essentially similar to that described in Example I, 2.23 (7 millimoles) of 2,5-bis-(chloromethyl) - 1,4 - di-n-butoxybenzene was dissolved in 25 ml. of redistilled N,N-dimethylacetamide and rapidly added to 25 ml. of a 0.84 N N,N-dimethylacetamide solution of CrCl₂ (21 millimoles). After 2 hrs. at 70° C., a total of 1.64 g. (92.5%) of crude poly (2,5-di-n-butoxy - p- phenylenedimethylene) was obtained as a faintly-green solid which after 6½ hrs. extraction with acetone in a Soxhlet apparatus and drying in vacuo, afforded a 84.6% yield of acetone insoluble high polymeric poly(2,5 - di-n-butoxy-p-phenylenedimethylene) as a white powder.

*Analysis.*—Calculated for $(C_{16}H_{24}O_2)_n$: C, 77.55%; H, 9.67%. Found: C, 77.35%; H, 9.69%.

The high polymer was swelled by benzyl benzoate at 25° C. but did not entirely dissolve; it was completely soluble at 138° C. At 222° C. in benzyl benzoate it exhibited an inherent viscosity of 0.19 (0.42 g. per 100 ml. solvent), determined as described in Example I.

The high polymer melted sharply at 226° C. on a Dennis bar. Its X-ray diffraction pattern showed lines as follows: 13.10 (s), 6.32 (vw), 5.68 (vw), 4.67 (vw), 4.35 (vw), 3.96 (m), 2.98 (vw), 2.72 (vw), 2.47 (vw), and 2.15 A. (vw).

EXAMPLE XVIII.—CONVERSION OF 1,2,4,5-TETRAKIS(BROMOMETHYL)BENZENE TO A POLYMERIC PRODUCT OF HIGH THERMAL STABILITY

In an apparatus and in a manner essentially similar to that described in Example I, 3.20 g. (7.1 millimoles) of 1,2,4,5 - tetrakis(bromomethyl)benzene, M.P. 160°–160.5° C. (prepared by a published method, Chem. Ber., 89, 2328 (1956)) in 25 ml. of redistilled N,N - dimethylacetamide was rapidly added to 37.6 ml. of a 0.948 N N,N - dimethylacetamide of CrCl₂ (35.6 millimoles). After 2 hrs. at 70° C. a total of 1.06 g. of crude polymer was obtained which after extraction with acetone in a Soxhlet apparatus yielded 0.72 g. of a light brown solid.

*Analysis.*—Found: C, 79.06%; H, 6.53%; Br, 14.51%.

Thermogravimetric analysis of this polymer under nitrogen, at a heating rate of 150° C./hour, showed a gradual weight loss started at 160° C. which reached 60% at 500° C. The final residue at 900° C. amounted to 56% of the weight of the starting polymer.

EXAMPLE XIX.—CONVERSION OF 1,4-BIS-(α,α-DICHLOROBENZYL)BENZENE TO POLY(α,α'-DIPHENYL-p-XYLYLIDENE)

In an apparatus and in a manner essentially similar to that described in Example I, 0.99 g. (2.5 millimoles) of 1,4 - bis - (α,α - dichlorobenzyl)benzene (prepared by treating 1,4 - dibenzoylbenzene with phosphorous pentachloride, M.P. 90°–92° C.) in 25 ml. redistilled N,N-dimethylactamide was added rapidly to 20.3 ml. of a N, N-dimethylacetamide solution of CrCl₂ (20 millimoles). After 2 hours at 70° C. a total of 0.52 g. (82.5%) of crude polymer was obtained, which after Soxhlet extraction with acetone yielded 74% of poly(α,α'-diphenyl-p-xylylidene) as an orange powder.

*Analysis.*—C, 93.84%; H, 5.54%; Cl, 0.30%.

This analysis corresponds well to the formula

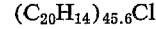
$$(C_{20}H_{14})_{45.6}Cl$$

Thermogravimetric analysis of this polymer under nitrogen, at a heating rate of 150° C./hour, showed no weight loss up to 450° C., a 7% weight loss at 500° C. and a residue of 58% at 900° C.

The substance did not dissolve after 1 hour in Arochlor 1254 at 305° C. Swelling was observed.

EXAMPLE XX.—CONVERSION OF 4,4'-BIS-(α,α-DICHLOROBENZYL)DIPHENYL ETHER TO POLY [4,4'-OXYBIS-(α-PHENYLBENZYLIDENE)]

In an apparatus and in a manner essentially similar to that described in Example I, 1.21 g. (2.5 millimoles) of 4,4'-bis-(α,α-dichlorobenzyl)diphenyl ether in 25 ml. of redistilled N,N-dimethylacetamide was rapidly added to 20.3 ml. of a 0.984 N N,N-dimethylacetamide solution of CrCl₂ (20 millimoles). After 2 hours at 70° C., a total of 0.98 g. 114% yield) of crude polymeric product was obtained, which, after extraction in a Soxhlet apparatus with acetone afforded a 91.8% yield of poly[4,4'-oxybis(α-phenylbenzylidene)] as a yellow solid.

*Analysis.*—Calculated for $(C_{26}H_{18}O)_{20}$ Cl: C, 89.5%; H, 5.15%; Cl, 0.5%. Found: C, 89.66%; H, 5.24%; Cl, 0.49%.

Thermogravimetric analysis of this polymer under nitrogen, at a heating rate of 150° C./hour, showed no weight loss up to 425° C., a loss of only 5% at 500° C. and a final residue of 57.5% at 900° C.

The substance did not dissolve after 1 hour in Arochlor 1254 at 305° C. although swelling was observed.

EXAMPLE XXI.—CONVERSION OF $\alpha,\alpha,\alpha',\alpha',\alpha'$-HEXACHLORO-p-XYLENE TO A POLYMERIC PRODUCT In an apparatus and in a manner essentially similar to that described in Example I, 2.40 g. (7.65 millimoles) of $\alpha,\alpha,\alpha',\alpha',\alpha'$-hexachloro-p-xylene, M.P. 112°–113° C., in 17 ml. of redistilled N,N-dimethylacetamide was rapidly added to 28 ml. of a 0.82 N N,N-dimethylacetamide solution of $CrCl_2$ (23 millimoles). After 2 hours at 70° C. a total of 1.48 g. of crude polymer was obtained which, after extraction in a Soxhlet apparatus with acetone, afforded 0.97 g. of yellow powder.

*Analysis.*—Found: C, 57.35%; H, 2.69%; Cl, 38.71%.

Correcting for residue, presumed to be ash, this analysis indicates an atomic ratio of $C_8H_{3.71}Cl_{1.74}$. This substance was insoluble in benzyl benzoate at 305° C. In Arochlor 1245 at 305° C. it was partly soluble. The X-ray pattern showed bands as follows: 11.0–4.45 (vw, broad), 4.04–3.57 (vw, broad) and 3.43–2.80 A. (vw, broad).

EXAMPLE XXII.—FORMATION OF POLY[4,4'-OXYBIS($\alpha$-PHENYLBENZYLIDENE)] IN SITU IN A GLASS CLOTH SUPPORT A strip of glass cloth about 12 x 2 x ⅛ inches in size is impregnated with a solution containing about 25% by weight of 4,4'-bis($\alpha,\alpha$-dichlorobenzyl)diphenyl ether in N,N-dimethylacetamide for about 5 min. at room temperature under an inert atmosphere (nitrogen) in a glove box. The strip is then removed from the impregnating bath and allowed to drain for 5 minutes. It is then rapidly immersed in a stirred bath containing a 1N solution of $CrCl_2$ in N,N-dimethylacetamide heated to 70° C., and allowed to remain there for 15 minutes. During this time the yellow poly[4,4'-oxybis($\alpha$-phenylbenzylidene)] forms in the interstices of the glass cloth and on the surface of the glass fibers themselves.

The strip is then removed from the polymerization bath and carefully dipped in three successive de-ionized water baths to wash out all metal salts and N,N-dimethylacetamide solvent. It is found that the strip now has a dense coating and filling of the polymeric poly[4,4'-oxybis($\alpha$-phenylbenzylidene)] deposited in situ by the reactive coupling agent of this invention.

The coated and filled strip is finally subjected to heat and pressure (about 300°–400° C. and 10,000 p.s.i.g.) whereupon a degree of fusion of the deposited polymer takes place rendering the strip relatively impervious to the passage of gases and liquids. Several such strips can be laminated together by heat and pressure to afford structures of great value as ablative heat barriers for shielding purposes in such applications as rocket nozzles, missiles and space vehicles.

While the above in situ deposition method is particularly suited for those polymers prepared by the process of this invention which are usually obtained in the insoluble crosslinked form as a consequence of the use of monomers of functionality greater than two such as for example, 4,4 - bis - ($\alpha,\alpha$-dichlorobenzyl)benzene or 1,2,4,5-tetrakis(bromomethyl)benzene, it is equally well suited to the deposition of the soluble non-crosslinked poly(arylenedialkylidene) polymers prepared by the coupling of bis-($\alpha$-haloalkyl)aromatic compounds. For example, poly(p-xylylene) can be deposited in situ in various substrates by impregnating the substrate with $\alpha,\alpha'$-dichloro-p-xylene and then treating the impregnated object with the $CrCl_2$ coupling solution, and finally washing out the metal salts with water. Fusion is accomplished at about 200°–400° C. under pressure, and impervious, heat-resistant impregnated objects are obtained.

It is also feasible to impregnate the substrate first with the $CrCl_2$ coupling solution, whereupon the $CrCl_2$ coupling agent itself becomes absorbed and otherwise held in the substrate. Subsequent contacting of substrates thus impregnated with coupling agents with the halogen-containing monomers disclosed above then causes the rapid deposition of the polymer in the substrate. However, it usually is more difficult to wash out the metal salts and excess coupling agent from such treated materials.

It is evident that the above-described polymer deposition methods, because of the rapidity of the formation of polymer, are ideally suited to a continuous operation in which the material to be impregnated, for example, a continuous strip of glass cloth, is passed successively through a monomer impregnation bath, a pair of opposed rollers to remove excess impregnation solution, a coupling bath containing $CrCl_2$, rollers to remove excess liquid, a wash bath, rollers to remove bulk water, a drying chamber and finally heated opposed rollers where pressure is applied and the impregnated material finally undergoes sufficient fusion to firmly fix it in place in the substrate and provide an impervious, continuous impregnated strip.

EXAMPLE XXIII.—CONVERSION OF TEREPHTHALOYL DICHLORIDE TO A SOLUBLE POLYMERIC PRODUCT

In an apparatus and in a manner essentially similar to that described in Example I, 1.53 g. (7.5 millimoles) of terephthaloyl dichloride M.P. 82°–83° C., in 25 ml. of redistilled N,N-dimethylacetamide was rapidly added to 25 ml. of a 0.916 N N,N-dimethylacetamide solution of $CrCl_2$ (23 millimoles) at 72° C. An exotherm to 83° C. was observed and a brown solution was obtained. After 2 hours at 70° C. it was found that 4.5 millimoles of $CrCl_2$ had not reacted; for a consumption of 1.3 moles of $CrCl_2$ per equivalent of chlorine in the diacyl chloride. The reaction mixture was diluted with 500 ml. $H_2O$ and a green-brown fine gelatinous solid was recovered by centrifugation. The solid was washed with water and finally boiled with 1:1 HCl solution for 10 min. A yellow solid separated and was collected, washed and dried, 0.633 g. (65% based on $\{CO-C_6H_4-CO\}$. The solid softened and became plastic with decomposition and darkening, at 230°–250° C. on a Dennis bar.

Analysis.—Calculated for $\{CO-C_6H_4-CO\}_n$: C, 72.73%; H, 3.05%. Found: C, 66.98%; H, 4.70%; residue, 3.2%.

The polymer was completely soluble in N,N-dimethylacetamide and could be reprecipitated by adding such solutions to water. Reprecipitated material exhibited an inherent viscosity of 0.1 (0.25 g. per 100 ml. solvent) at 22.2° C., but still contained some ash (on ignition).

The infrared absorption spectrum of the polymer showed bands as follows:

3420 cm.$^{-1}$, str. broad, —OH stretch
3060 cm.$^{-1}$, wk. broad, aromatic C—H stretch
2940 cm.$^{-1}$, wk. sharp, aliphatic C—H stretch
1720 cm.$^{-1}$, str. broad, C=O stretch, esters
1605 cm.$^{-1}$, str. sharp, —COO$^-$+aromatic ring
1500 cm.$^{-1}$, wk. sharp, aromatic ring
1410 cm.$^{-1}$, med. sharp, —COO$^-$ anion
1240 cm.$^{-1}$, str. broad, C—O stretch, aromatic esters
1100 cm.$^{-1}$, med. broad, C—O stretch, aromatic esters The above spectrum indicates the presence of ester groups as well as carboxylate anions and suggests that the $\alpha$-diketone units in the original polymer may have reacted further to form enediol ester units which would perhaps have carboxylic acid or carboxylate salt terminal groups on the resulting side branches.

EXAMPLE XXIV.—CONVERSION OF ISOPHTHALOYL DICHLORIDE TO A SOLUBLE POLYMERIC PRODUCT

In an apparatus and in a manner essentially similar to that described in Example I, 1.42 g. (7.0 millimoles) of isophthaloyl dichloride, M.P. 42°–44° C., in 25 ml. of redistilled N,N-dimethylacetamide was rapidly added at 70° C. to 23 ml. of a 0.925 N N,N-dimethylacetamide solution of $CrCl_2$ (21.4 millimoles) also at 70° C. The resulting solution changed from blue-green to green to brown over a period of 5 min. No exotherm was observed. After 2 hours at 70° C. the reaction mixture was poured into 500 ml. of water. A light, yellow-green gelatinous solid was obtained which dried to a dark green solid, 1.34 g. (143% as $+CO-C_6H_4-CO+_x$. This solid could be dissolved in N,N-dimethylacetamide and reprecipitated with water.

While particular embodiments of this invention are shown above, it will be understood that the invention is obviously subject to variations and modifications without departing from its broader aspects. Moreover, the novel polymeric products of the present invention are readily moldable by utilizing conventional resin molding procedures into a variety of products having outstanding heat stability and radiation resistant characteristics.

What is claimed is:

1. A polymerization process which comprises reacting at least one halogen-containing aromatic compound, capable of polymerization, having the formula $$(XCR_1R_2)_n-Ar-(CR_3R_4X')_m$$

wherein:

X and X' are selected from the group consisting of chlorine, bromine, iodine, fluorine and mixtures thereof;
$R_1$, $R_2$, $R_3$, and $R_4$ are univalent radicals selected from the group consisting of hydrogen, bromine, iodine, trifluoromethyl, lower alkyl group having from 1 to 6 carbon atoms, aryl group having 6 to 10 carbon atoms, and mixtures thereof;
$n$ and $m$ are integers of at least 1;
Ar is an aromatic substituent selected from the group consisting of arenes, aromatic heterocyclics, and fused ring aromatics with a lower valent transition metal salt at a temperature within the range of about −30° to 300° C. in the presence of a dipolar aprotic solvent having a dielectric constant greater than about 15 as the sole solvent in the reaction mixture, said solvent characterized by being unable to donate labile hydrogen atoms to form strong hydrogen bonds with contained solutes.

2. The process of claim 1 wherein said transition metal salt has a cation selected from the group consisting of divalent chromium, divalent vanadium and trivalent titanium.

3. The process of claim 2 wherein said transition metal salt is chromous chloride.

4. The process of claim 1 wherein $n$ plus $m$ equals 2.

5. The process of claim 1 wherein said halogen-containing aromatic compound is $\alpha,\alpha'$-dichloro-p-xylene.

6. The process of claim 1 wherein said halogen-containing aromatic compound is 2,5-bis-(chloromethyl)-p-xylene.

7. The process of claim 1 wherein said halogen-containing aromatic compound is bis-(chloromethyl)durene.

8. The process of claim 1 wherein said halogen-containing aromatic compound is 4,6-bis-(chloromethyl)-m-xylene.

9. The process of claim 1 wherein said halogen-containing aromatic compound is bis-(chloromethyl)mesitylene.

10. The process of claim 1 wherein said halogen-containing compound is $\alpha,\alpha,\alpha',\alpha',\alpha'$-hexachloro-p-xylene.

11. The process of claim 1 wherein said halogen-containing compound is 1,2,4,5-tetrakis(bromomethyl)benzene.

12. The process of claim 1 wherein said halogen-containing compound is 4,4'-bis-($\alpha,\alpha$-dichlorobenzyl)diphenyl ether.

13. The process of claim 1 wherein said halogen-containing compound is 1,4-bis-($\alpha,\alpha$-dichlorobenzyl)benzene.

14. The process of claim 1 wherein said aprotic solvent is dimethylacetamide.

15. The process of claim 1 wherein said aprotic solvent is dimethylformamide.

16. The process of claim 1 wherein said aprotic solvent is acetone.

17. The process of claim 1 wherein said aprotic solvent is acetonitrile.

18. A copolymerization process which comprises reacting a solution of (I) at least one halogen-containing compound capable of copolymerization, having the formula $$(XCR_1R_2)_n-Ar-(CR_3R_4X')_m$$

wherein:

X and X' are selected from the group consisting of chlorine, bromine, iodine, fluorine and mixtures thereof;
$R_1$, $R_2$, and $R_3$ and $R_4$ are selected from the group consisting of hydrogen, bromine, iodine, trifluoromethyl, lower alkyl group having from 1 to 6 carbon atoms, an aryl group having 6 to 10 carbon atoms, and mixtures thereof;
$n$ and $m$ are integers of at least 1;
Ar is a divalent arene radical, with a lower valent chromium salt with (II) an olefinic compound having the formula $$R_5CH=CR_6R_7$$

wherein:

$R_5$ is selected from the group consisting of hydrogen, cyano radical, and an aryl group having from 6 to 10 carbon atoms;
$R_6$ is selected from the group consisting of hydrogen, a lower alkyl group having from 1 to 6 carbon atoms, and a COOR radical wherein R is an alkyl group having from 1 to 12 carbon atoms;
$R_7$ is selected from the group consisting of hydrogen, a CN radical, a $NO_2$ radical, a COOH radical, a lower alkyl having from 1 to 6 carbon atoms, a $CH_2COOR$ radical and a COOR radical wherein R is a lower alkyl having from 1 to 12 carbon atoms, a $CONH_2$ radical, CONHR' and $CONR'_2$ radicals wherein R' is a lower alkyl group having from 1 to 6 carbon atoms, and an aryl group having 6 to 10 carbon atoms at a temperature within the range of about 0° to 200° C. in the presence of a dipolar aprotic solvent having a dielectric constant greater than about 15 as the sole solvent in the reaction mixture, said solvent characterized by being unable to donate labile hydrogen atoms to form strong hydrogen bonds with contained solutes.

19. The process of claim 18 wherein said chromium salt is chromous chloride.

20. The process of claim 18 wherein said copolymerization process is carried out under a nitrogen atmosphere.

21. The process of claim 18 wherein said aprotic solvent is selected from the group consisting of dimethylformamide, dimethylacetamide, acetone, acetonitrile, dimethyl sulfoxide, tetrahydrothiophene dioxide, nitrobenzene, and propylene carbonate.

22. Poly(4,5-dimethyl-o-phenylenedimethylene).

23. Poly(5,6-indanylenedimethylene).
24. Poly(1,4-(1,2,3,4-tetrahydro)naphthylene).
25. Poly(2,4,6-trimethyl-m-xylylene).
26. Poly(5,8 - (1,2,3,4-tetrahydro)naphthylenedimethylene).
27. Poly(2,3,5,6-tetrachloro-p-phenylenedimethylene).
28. Poly(2,5-di-n-butoxy-p-phenylenedimethylene).

References Cited
UNITED STATES PATENTS
3,265,640 8/1966 Overhults et al. _____ 260—2

JOSEPH L. SCHOFER, *Primary Examiner.*
H. WONG, *Assistant Examiner.*